United States Patent [19]

Conzett

[11] Patent Number: 5,071,298

[45] Date of Patent: Dec. 10, 1991

[54] TRANSPORT CARRIER FOR VEHICLES

[76] Inventor: Dale C. Conzett, 1045 Grove Ter., Dubuque, Iowa 52001

[21] Appl. No.: 615,587

[22] Filed: Nov. 19, 1990

Related U.S. Application Data

[63] Continuation-in-part of Ser. No. 276,479, Nov. 28, 1988, abandoned.

[51] Int. Cl.⁵ .................................................. B60P 3/08
[52] U.S. Cl. .................................... 410/27; 410/24.1; 410/25; 410/29
[58] Field of Search ...................... 410/8, 9, 10, 11, 12, 410/13, 24, 24.1, 25, 26, 27, 28, 28.1, 29, 29.1, 30; 238/133, 149

[56] References Cited

U.S. PATENT DOCUMENTS

| | | | |
|---|---|---|---|
| 1,304,656 | 5/1919 | Butterworth | 410/13 |
| 1,887,325 | 11/1932 | Pratt et al. | 410/9 |
| 1,931,803 | 10/1933 | Perkins et al. | 410/28.1 |
| 2,078,700 | 4/1937 | Tobin | 410/25 X |
| 3,149,583 | 9/1964 | Morrill | 105/455 |
| 3,511,392 | 5/1970 | Blunden et al. | 410/10 |
| 3,580,627 | 5/1971 | Underwood et al. | 410/24 |
| 3,611,949 | 10/1971 | Peisner | 410/25 X |
| 3,618,796 | 11/1971 | Peisner | 410/24 X |
| 3,994,523 | 11/1976 | Harold | 410/27 X |
| 4,307,985 | 12/1981 | Desprez et al. | 410/46 |
| 4,668,142 | 5/1987 | Fity et al. | 410/26 |
| 4,759,668 | 7/1988 | Larsen et al. | 410/26 |

FOREIGN PATENT DOCUMENTS

| | | | |
|---|---|---|---|
| 110612 | 4/1928 | Australia | 238/149 |
| 1015319 | 12/1965 | United Kingdom | 410/24.1 |

Primary Examiner—Robert J. Spar
Assistant Examiner—Craig Slavin
Attorney, Agent, or Firm—James C. Nemmers

[57] ABSTRACT

An apparatus and method for transporting or storing in a compact and efficient manner large objects, such as vehicles, whose shape and/or composition do not lend themselves to a high density arrangement. Using automobiles as an example, the apparatus uses trays to support the ends of the automobiles, the trays riding on open rails that are positioned at different levels to permit nesting of automobiles of different sizes and shapes. Some of the rails may be pivoted or be equipped with switches and gates, and the upper rails may have a wider gauge than the lower rails. With this arrangement, and by proper selection of carrier trays to correspond to the gauge of the rails at a particular level, damaged or otherwise undriveable vehicles can be loaded and transported as well as vehicles that are driveable.

5 Claims, 5 Drawing Sheets

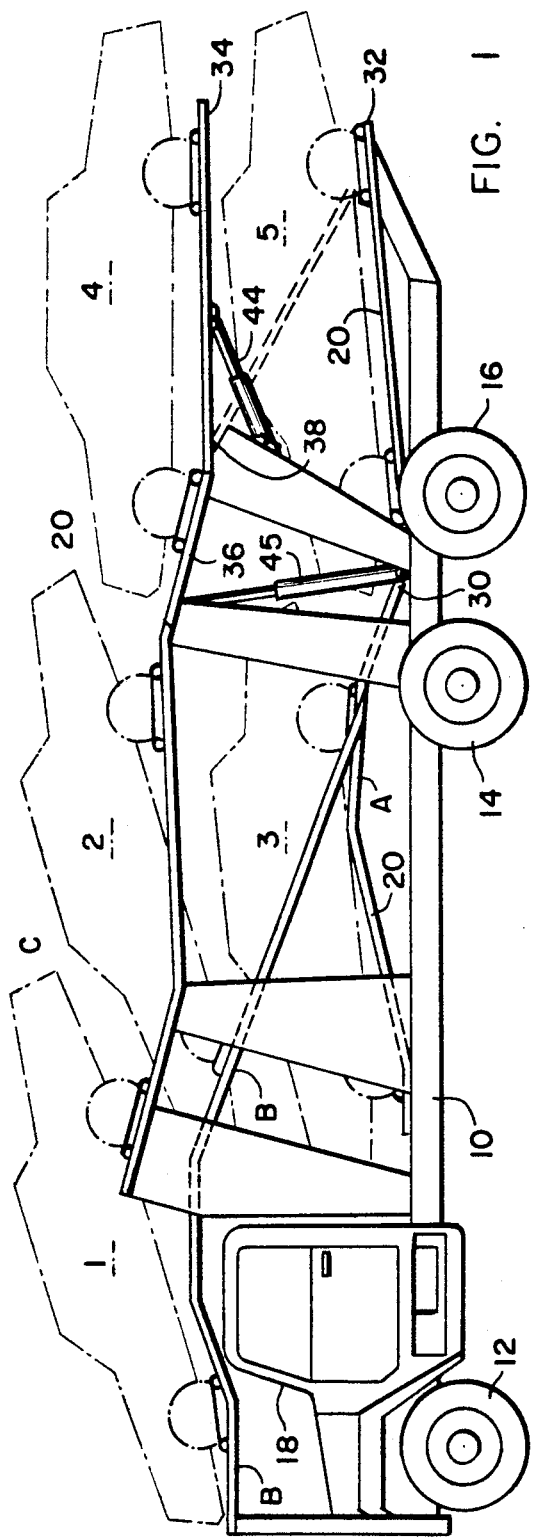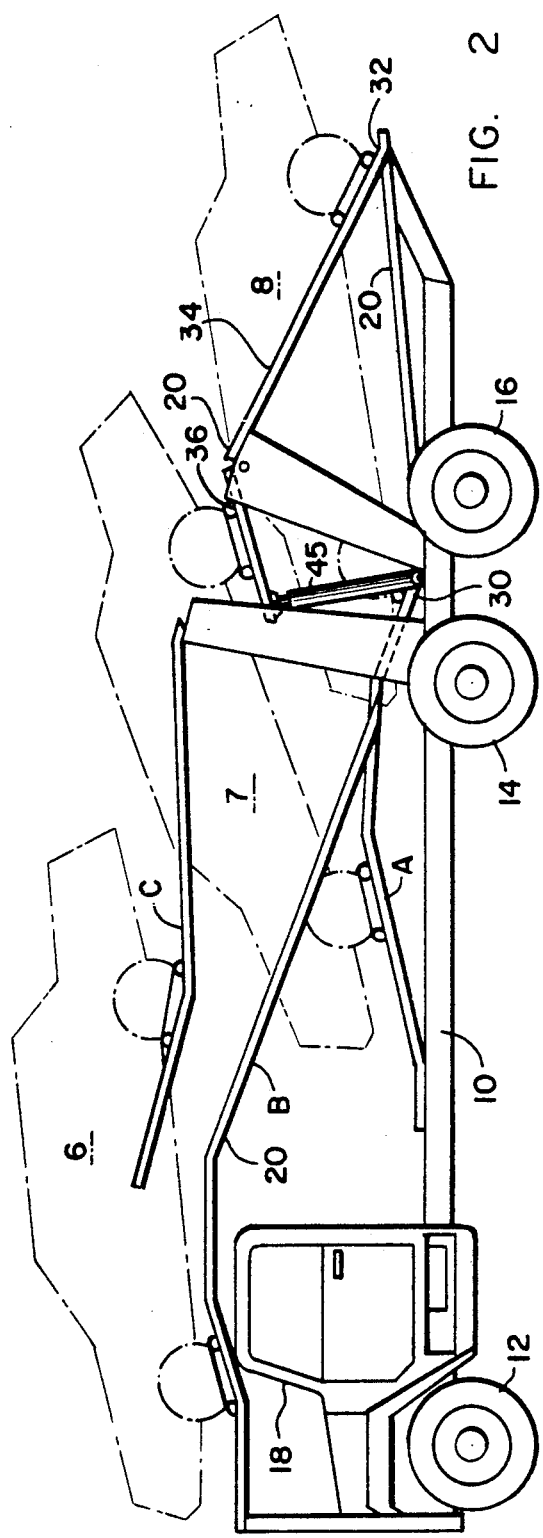

TRANSPORT CARRIER FOR VEHICLES

BACKGROUND OF THE INVENTION

This application is a continuation in part of my earlier copending application Ser. No. 276,479 filed Nov. 28, 1988, now abandoned.

New automobiles and other vehicles must be transported from the place of final assembly to the various dealerships throughout the country. Transportation is commonly by motor trucks or truck-trailer combinations or they can be transports by train, ship or boat or airplane In any event, the vehicles are loaded, usually by driving, onto the truck or trailer where they are secured in place for transport.

Also, damaged or otherwise undriveable vehicles are frequently required to be transported from one site to another. Such vehicles are hauled using trucks or truck trailer combinations, but because the vehicles are undriveable, it is much more difficult to load and unload these vehicles and loads are usually limited to a relatively few vehicles.

A number of different arrangements are known and used for transporting automobiles and other vehicles, but because of the specific arrangements that are known and used, the number of vehicles that can be carried is limited. Commonly, conventional transports for damaged vehicles are limited to carrying four such vehicles, and many conventional transports are unable to carry vehicles unless they can be driven onto and off of the transport. This frequently results in the carrier being empty on a return trip, which, of course, is costly for the carrier. Obviously, it is preferable if the carrier can be loaded most if not all of the time between destinations.

Also, because of size and weight limitations imposed by various states on over-the-road trucks and trailers, it is important for carriers to maximize the available space and reduce the weight on a truck or trailer of a given size. There is therefore a need for a transport carrier which can carry a variety of sizes and types of vehicles in a compact and efficient manner, thus giving the operator flexibility in what can be carried. There is a further need for a single transport carrier that can handle not only driveable but undriveable vehicles. There is a further need for carriers of all types to provide for unrestricted center load space so that backhaul loads may be accommodated in a conventional manner. This is accomplished by storing the trays in areas other than the load space.

SUMMARY OF THE INVENTION

As illustrated in the preferred embodiments, the invention utilizes a truck or trailer that utilizes outboard rails with open centers, with the rails being positioned at multiple levels, the higher the level the wider the track width or gauge of the rails. These multiple level, multiple width rails accommodate carrier trays that ride on the rails and upon which rest the wheels of the vehicle to be carried Some of the rails are stationary while some of the rails are pivotally mounted so that they can be moved into different selected positions depending upon the type and size of the vehicles being carried. An alternate arrangement is to use multiple rails of the same gauge and use switches and gates to obtain the most desirable tray-vehicle positions. Combinations of these two alternate arrangements are also possible depending upon the particular application for which the unit is designed. These arrangements provides maximum flexibility in positioning vehicles on the transport carrier, and with the aid of a power winch or other means, vehicles that are not driveable can be loaded and unloaded on the transport carrier.

BRIEF DESCRIPTION OF THE DRAWINGS

FIG. 1 is a diagrammatic side elevational view illustrating an arrangement for carrying five compact vehicles;

FIG. 2 is a diagrammatic side elevational view illustrating an arrangement for carrying three large vehicles;

DESCRIPTION OF THE PREFERRED EMBODIMENTS OF THE INVENTION

Figure 3:
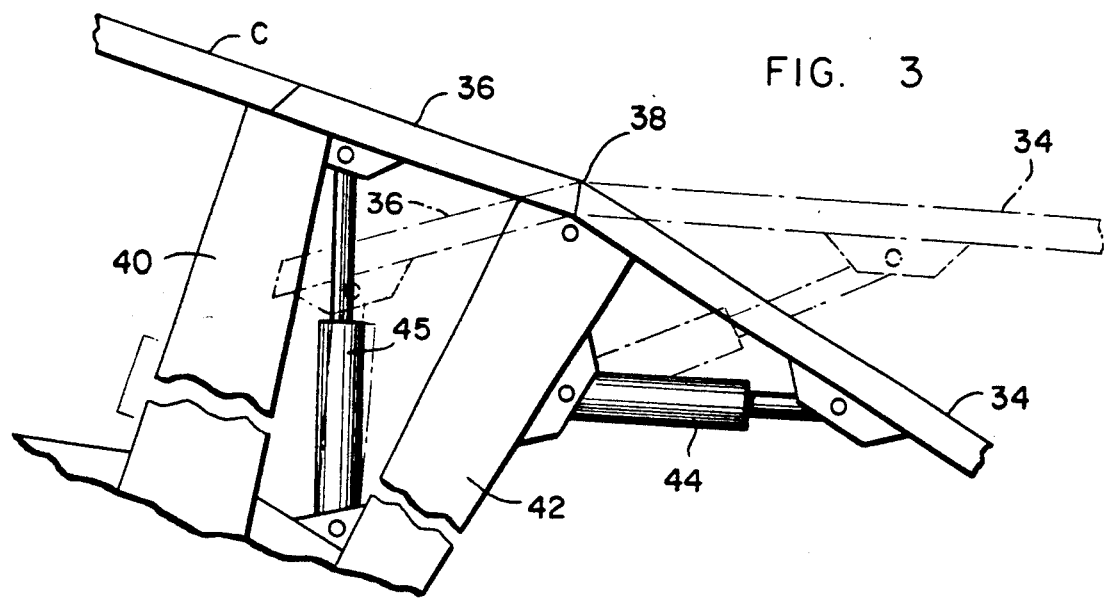
FIG. 3 is a side elevational view of a typical tilting mechanism for a pivotally mounted rail.

Referring to the drawings, and especially to FIGS. 1 and 2, there is illustrated a truck having a mainframe 10 supported on an axle carrying front wheels 12 and a pair of rear axles supporting rear wheels 14 and 16. Frame 10 also supports an operator's compartment or cab 18.

Secured to and supported by the mainframe 10 in any suitable manner are a plurality of carrier rails 20. The supporting framework has been omitted from the drawings in the interest of clarity, especially since such framework is within the knowledge of those skilled in the art.

Figure 4:
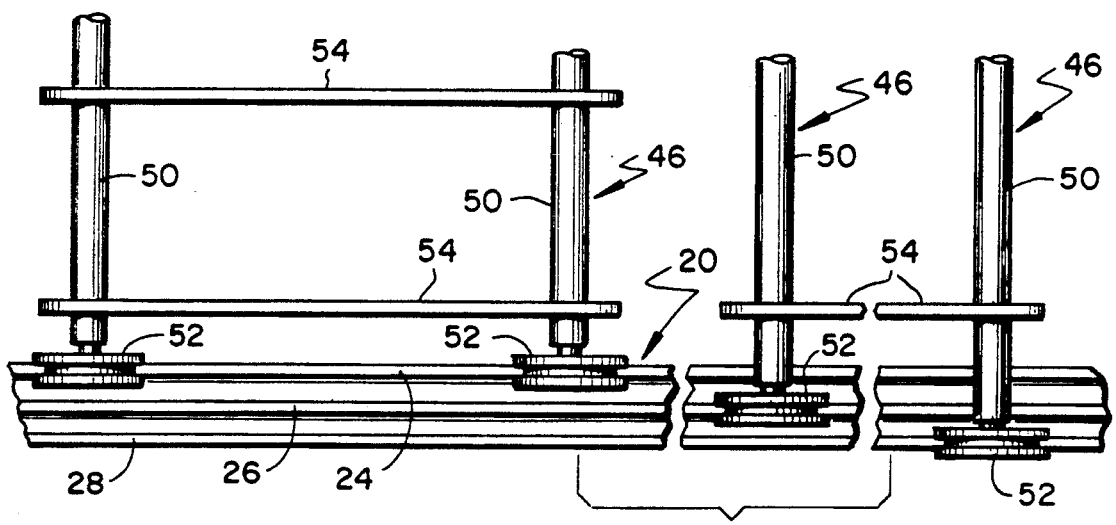
FIG. 4 is a top view illustrating multiple gauge rails and carrier trays for each of the different gauges.
Figure 5:
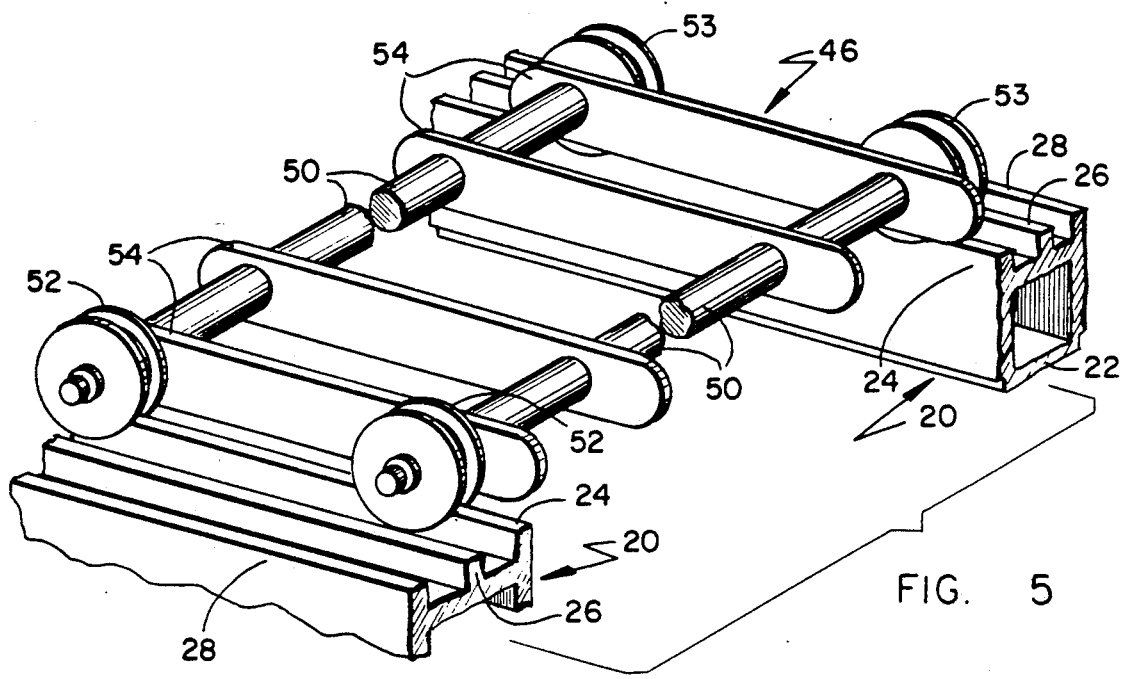
FIG. 5 is a perspective view illustrating a carrier tray on the narrowest gauge.

Referring now especially to FIG. 4 and FIG. 5, there is illustrated a typical carrier rail indicated generally by the reference numeral 20. Each rail 20 has a tubular main support 22 which supports three parallel rails, an inboard rail 24, a middle rail 26 and an outboard rail 28. The top surface of each of the rails 24, 26 and 28 are at the same level and preferably are of the same width. Obviously, there is a carrier rail 20 that extends longitudinally (from front to rear) along both the left and right sides of the transport vehicle, and these right and left side rails are parallel to each other and at the same level. Also, the lateral spacing of the right and left hand carrier rails 20 is necessarily wider than the tread width of the vehicles to be carried.

As best seen in FIGS. 1 and 2, there are carrier rails 20 at three different levels. The lowest or bottom rail has been designated by the letter "A" while the middle rails has been designated by the letter "B" and the highest rail designated by the letter "C". As shown in FIGS. 1 and 2, middle rail B joins with the lowest rail A at a switch point 30. Similarly, the highest rail C joins with the lowest rail A at switch point 32. The switch points are of any suitable design which will permit, for example, a carrier traveling on the outboard rail 28 to pass switch point 30 and continue on the lowest rail A, while permitting a roller traveling on the middle rail 26 to continue traveling onto the middle rail B as it passes switch point 30. This is described more fully hereinafter. Also, as illustrated In FIG. 1, the rear most portion 34 of rail C is pivoted and moveable from an upper position shown in the full lines of FIG. 1 to a lower position shown in the dotted lines of FIG. 1 in which lower position it contacts the lowest rail A and forms switch point 32.

Also, as illustrated in FIG. 2, highest rail C has a portion 36 that is removable or pivotable just forwarding of the pivot point 38 of rail C. This is more fully illustrated in FIG. 3 which shows a first support 40 for the forward portion of rail C and a second support 42 at the pivot point 38, with hydraulic cylinder 44 providing the means for pivoting the rear portion 34 of rail C from its lower to its upper position. Hydraulic cylinder 45 provides for pivotal movement of rail portion 36.

Figure 6:
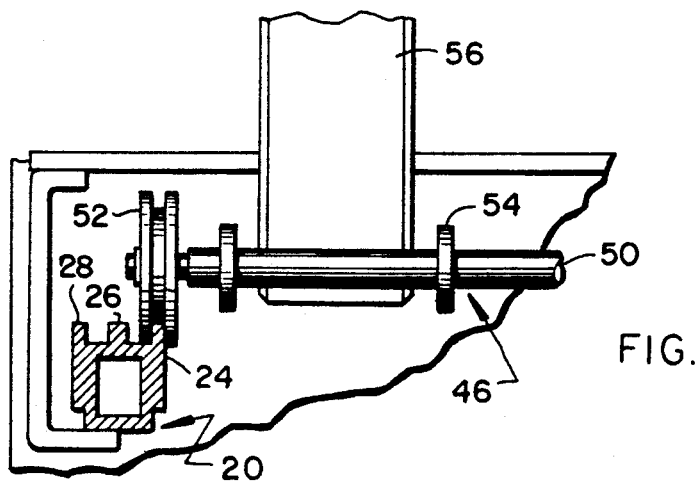
FIG. 6 is a sectional view showing a carrier tray and vehicle wheel.
Figure 7:
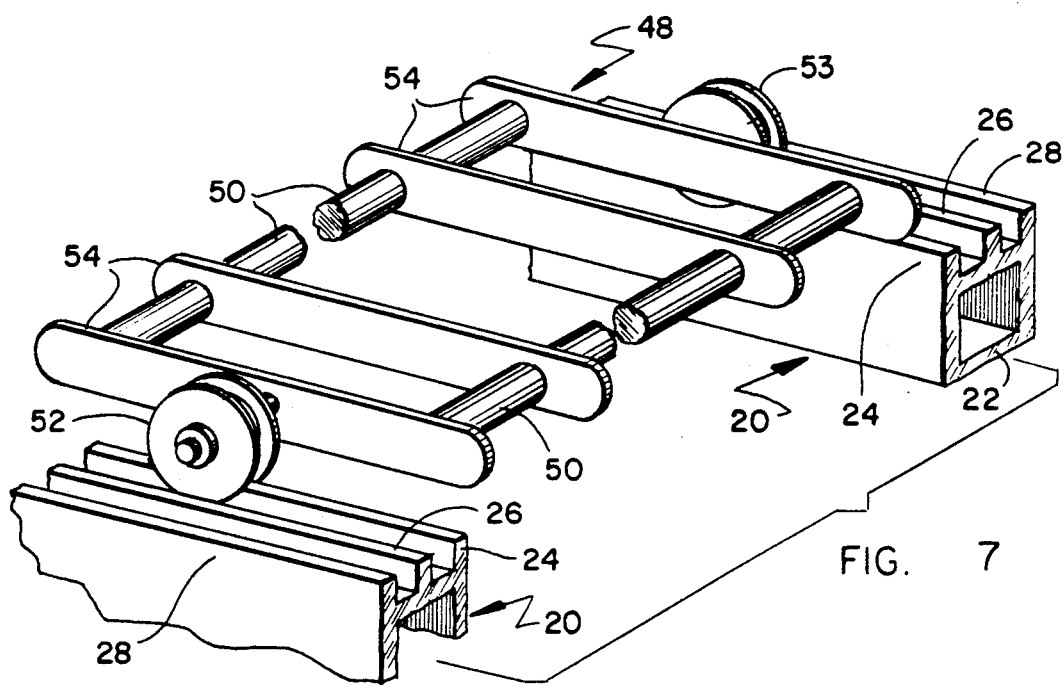
FIG. 7 is a perspective view showing a two-wheel carrier.

In FIGS. 4 and 5, there are illustrated typical carrier trays 46 of the four roller style while FIG. 7 illustrates a carrier tray 48 of the two roller style. Carrier tray 46 consists of a pair of parallel spaced apart axles 50 which support on their outer ends rollers 52 and 53, the left rollers 52 being In alignment and the right rollers 53 being in alignment. The axles 50 are connected by longitudinal supports 54 which may be axially spaced apart a distance to provide retainers for the tire 56 of the vehicle to be carried (see FIG. 6). The carrier trays may be of either the four roller or two roller style depending upon the particular application. In any event, the operator of the transport would be supplied with a plurality of carrier trays of three different gauges. The first gauge would have its rollers 52 and 53 axially spaced a distance so that the carrier tray 46 would ride on the inboard rails 26 while the third set of carrier trays 46 would have its rollers 52 and 53 axially spaced so as to ride o the outboard rails 28. This is necessary in order to provide the flexibility of loading in the manner described hereinafter.

Figure 8:
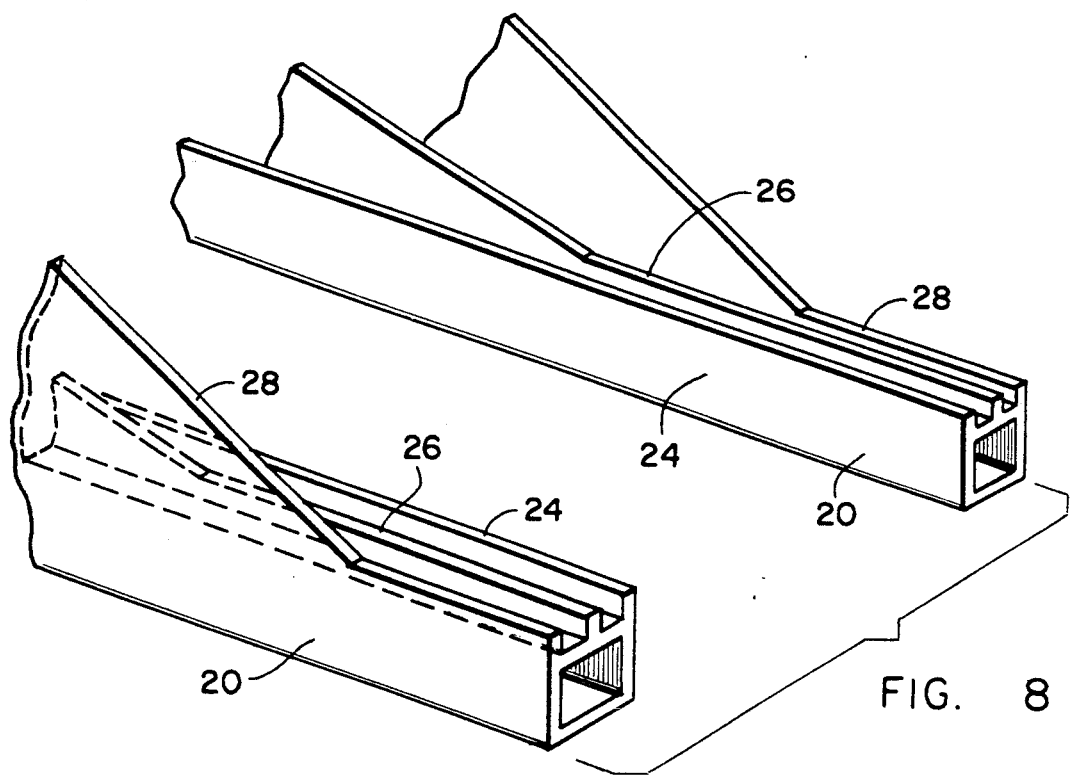
FIG. 8 is a perspective view showing multiple gauge rails arranged so as to provide for movement of carriers to different levels.
Figure 11:
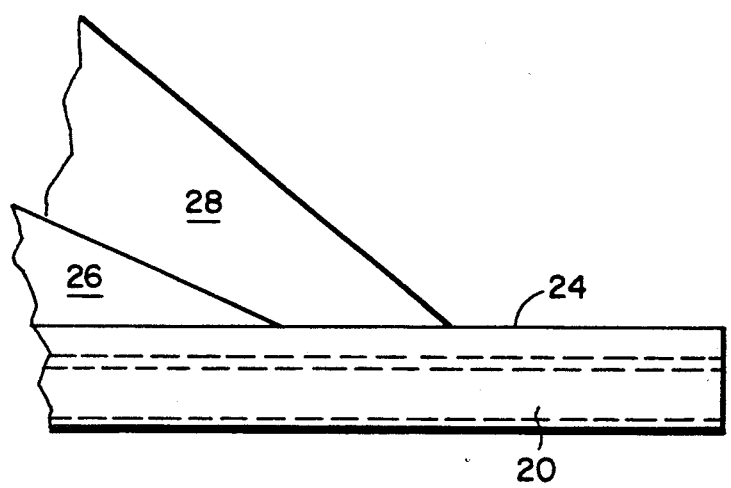
FIG. 11 is a side elevational view of the right hand rail of FIG. 8.
Figure 12:
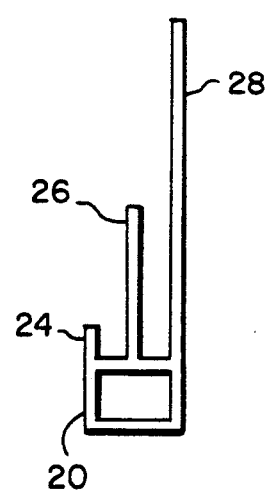
FIG. 12 is an end view of the rail of FIG. 11.

Because each of the carrier rails 20 has a triple track or rail as previously described, and because carrier trays 46 or 48 will be provided in different track widths or gauges so as to fit each of the three rails 24, 26 or 28, the correct carrier tray 46 must be selected when loading a vehicle so that the vehicle will be directed onto the proper one of the levels A, B or C. In FIGS. 8, 11 and 12 there is illustrated the construction of typical rails 20 at one of the switch points 30 or 32. The rails 20 illustrated in these figures show a construction for directing a carrier tray 46 to any of the three levels, but at a particular switch point the rails 20 may be constructed so as to switch a carrier tray to only one of the other levels. As illustrated in FIGS. 8, 11 and 12, at a desired switch point the outboard rail 28 rises at a slope to meet the carrier rail 20 at the upper level C and the middle rail 26 similarly rises slope to meet the carrier rail 20 at the middle level B, thus directing a carrier tray 46 to the desired level depending upon the gauge of the carrier tray 46 that arrives at the switch point.

Figure 9:
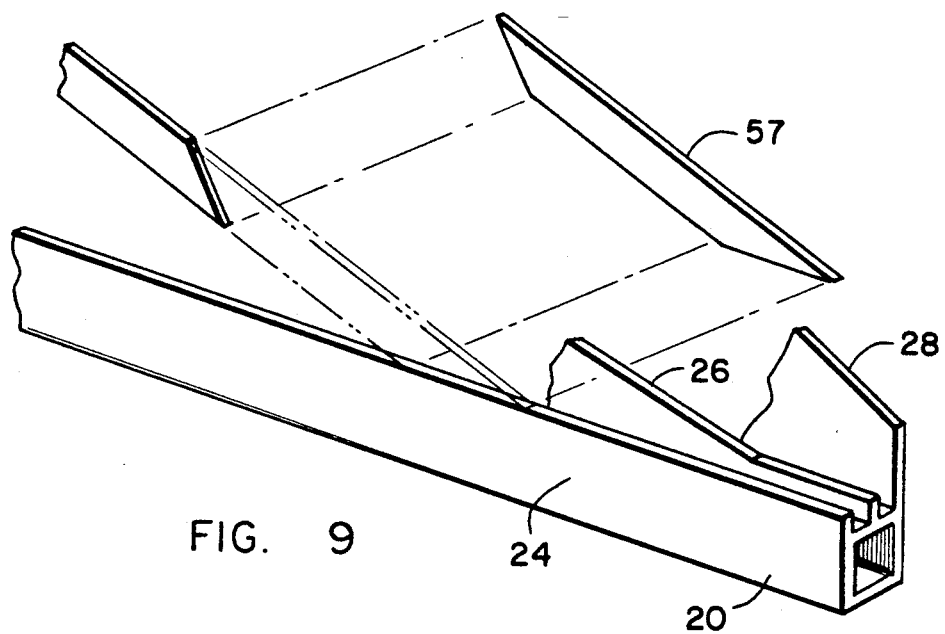
FIG. 9 is a perspective view of a rail and illustrating a gate arrangement for directing carriers to different levels.

In FIG. 9 there is illustrated a gate arrangement for directing a carrier tray to a desired level. If single carrier rails 20 are used at each of the three levels A, B and C, FIG. 9 illustrates a gate arrangement located at a switch point. If the carrier tray 46 that arrives at the switch point is of the narrowest gauge, the tray 46 will continue on the inboard rail 24. However, if the carrier tray 46 is of a wider gauge for either the middle level B or the upper level C, then a moveable gate 57 will be moved into place to connect the middle rail 26 with the middle rail 26 at level B, or the gate 57 will be moved into place to connect the outboard rail 28 with the rail at level C. Gate 57 can be moved into and out of connecting position in any suitable manner, either manually or by power operated means (not shown).

Figure 10:
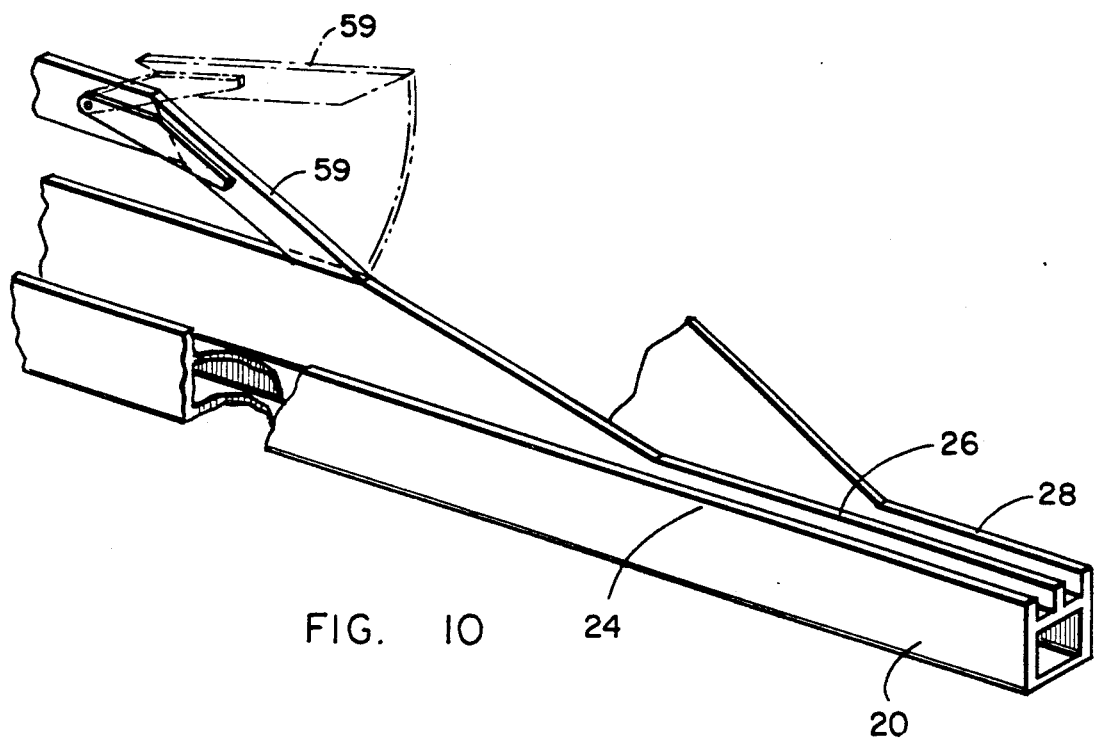
FIG. 10 is a perspective view of a rail and illustrating a switch arrangement for directing carriers to different levels.

If the upper levels B and C have single carrier rails 20 of different gauges, the widest being at level C, then the switching arrangement illustrated in FIG. 10 may be used rather than the gate arrangement of FIG. 9. A switching rail segment 59 is mounted for swingable movement into and out of engagement with the multiple carrier rail 20 located at one of the switch points. When in connecting position shown in dotted lines of FIG. 10, segment 59 will connect the middle rail 26 with the single rail of the same gauge located at level B. A similar switching segment can be provided for connecting the outboard rail 28 to the single rail of the same gauge located at level C.

Regardless of the specific switching means used to provide for directing a carrrier tray onto the desired level A, B or C, the arrangement of the vehicles to be carried would be the same. Referring first to FIG. 1, there is illustrated an arrangement in which five vehicles, numbered 1 through 5, have been loaded on the transport carrier. To load, a loading ramp, having triple rails corresponding in gauge to the carrier rails 20, is removably positioned with its upper end in line with the lowest carrier rail 20. To load vehicle number 1 onto the transport carrier, a carrier tray 46 would be selected so as to fit the middle rails 26, and the front wheels of the vehicle number 1 would then be placed on this carrier tray 46 and the vehicle moved forwardly by any suitable means, such as by connection to a suitable power winch (not shown). When vehicle number 1 has been moved forward a sufficient amount, the rear wheels of vehicle number 1 are then placed on a carrier tray 46 which has a track width to fit the outboard rails 28. As vehicle number 1 is then moved forwardly into the truck, the carrier tray 46 carrying the front wheels of vehicle number 1 will engage the middle rail 26 of carrier rail 20 and ride up onto the carrier rail at level B, while the rear carrier tray 46 carrying the rear wheels of vehicle number 1 will ride up on the outboard rails 28, thus moving the rear of the vehicles onto the carrier rail at the upper level C.

To load vehicle number 2, the front wheels are placed on a carrier tray 46 whose track width will fit the middle rails 26 while the rear wheels of vehicle number 2 are placed on a carrier tray 46 that will fit the outboard rails 28. Thus, when vehicle number 2 is moved forwardly, its front wheels will be carried up onto the middle carrier rail B while the rear wheels will be carried onto the highest rail carrier C.

Vehicle number 3 is now loaded by placing the front wheels on a carrier tray 46 whose track width will fit the inboard rails 24, with the rear wheels placed on a carrier tray 46 that will engage only the middle rails 26. Thus, when vehicle number 3 is moved forwardly, its front wheels will be moved along the lowest carrier rail A while the rear wheels will move up onto the middle carrier rail B.

Vehicle number 4 is positioned with both front and rear wheels on the highest carrier rail 20. Thus to load vehicle number 4, both front and rear wheels of vehicle number 4 are placed on carrier trays 46 that will engage the outboard rails 28. This vehicle is moved forwardly just onto the carrier rail C, and then the hydraulic cylinder 44 is actuated to pivot the rear portion 34 or rail C upwardly to the position indicated in FIG. 1 in full lines.

Vehicle number 5 is the last vehicle to be loaded, and both front and rear wheels of vehicle number 5 rest on the lowest rail A. Thus, carrier trays 46 are selected which have a track width that will engage the inboard rails 24. With the rear portion 34 of rail C already raised, vehicle number 5 can be moved forwardly to the position shown in FIG. 1.

FIG. 2 shows a varied arrangement of FIG. 1 for carrying three large vehicles. In this arrangement, vehicle number 6 is loaded by placing its front wheels on a carrier tray 46 whose gauge matches the gauge of the middle rails 26 and by placing the rear wheels on a carrier tray 46 whose gauge matches that of the outboard rails 28. Thus, when vehicle number 6 is moved forwardly, its front wheels will be carried forwardly onto the middle rail B while its rear wheels will be carried to the forward end of the highest rail C. This is similar to vehicle number 1 of FIG. 1.

When vehicle number 7 is to be loaded, its front wheels are placed on a carrier tray 46 whose track width matches the width of the inboard rails 24. The rear wheels of vehicle number 7 are placed on a carrier tray 46 whose track width is that of the outboard rails 28. Thus, when vehicle number 7 is moved forwardly, its front wheels will follow along the lowest rail A to near its forward end while its rear wheels will be carried onto the highest rail C. However, prior to the time that the rear wheels of vehicle number 7 are moved onto the highest rail C, section 36 is pivoted downwardly by cylinder 45 so that the rear wheels will move on to the now downwardly sloping section 36 of rail C, as indicated in FIG. 2.

Vehicle number 8 is loaded by placing the front wheels on a carrier tray 46 that will ride the inboard rails 24 and the rear wheels are placed on a carrier tray 46 that will ride the outboard rails 28. When loaded, the vehicle number 8 will be positioned as shown in FIG. 2 with the front wheels on the lowest rail A and the rear wheels at the rearward end of the highest rail C.

Obviously, other loading arrangements can be made depending upon the size and type of vehicles to be transported. The transport carrier of the invention, however, with its multiple-gauge rails at multiple levels or with same - gauge rails with appropriate switches and pivoting sections, provides extreme flexibility in loading arrangements. The use of the carrier trays having different gauges that match the different gauges of the multiple level rails makes it easy for an operator to load the vehicles once the desired arrangement has been determined. These carrier trays of different gauges are unique in that selection of a carrier tray having a particular track width determines the position of the vehicle on the transport carrier. The carrier rails being open in the center, provide unobstructed load placement without any restriction on the full use of the available storage space provided by the transport carrier. Pivotable and removable rail sections and switches add further flexibility to the various loading arrangements that can be utilized. The pivotable rail sections, such as the rear section 34 of rail C, serve the purposes of initially providing a ramp for loading and also serve as a load positioner and retainer. Of course, conventional winch and cable systems and hydraulic systems together with conventional holding devices are utilized where necessary. Obviously, loading arrangements other than those illustrated herein as well a variations on moveable rails, switches and removable sections can be made utilizing the principles of the invention. Various other revisions and modifications can be made to the preferred embodiments described herein without departing from the spirit and scope of the invention. It Is my intention, however, that all such revisions and modifications as are obvious to those skilled in the art will be included within the scope of the following claims.

What is claimed is as follows:

1. A carrier for transporting and storing vehicles, said carrier comprising a first level of parallel spaced-apart sets of rails supported at a lower level along each side of the carrier, a second level of parallel spaced-apart sets of rails supported a a level above the first sets of rails along each side of the carrier, a third level of parallel spaced-apart sets of rails supported at a level above the second sets of rails along each side of the carrier, the rails along each side of the carrier at the three levels being in substantial vertical alignment with the area between the sets at each level being open and unobstructed, each of the sets of rails at the first, second and third levels being of different gauges with the widest gauge being at the third level, the narrowest gauge being at the first level and the middle gauge being at the second level, carrier trays having wheels engagable with the rails, some of the carrier trays having wheels spaced-apart so as to be engagable with the rails of the widest gauge, some of the carrier trays having wheels spaced-apart so as to be engagable with the rails of the narrowest gauge, and some of the carrier trays having wheels spaced-apart so as to be engagable with the rails of the middle gauge, a selected one of the carrier trays supporting one end of the vehicle to be carried and a selected one of such trays supporting the other end, and means selectively providing for each carrier tray to be directed onto on of the levels of rails so that a tray supporting one end of the vehicle being carried can be positioned on either the same level of rails as the tray supporting the other end of the vehicle or on a different level of rails, the position of a vehicle on the carrier thereby being determined by selecting carrier trays engagable with the desired gauge of rails.

2. The carrier of claim 1 in which each set of rails at each level is a set of multiple rails that includes three parallel spaced-apart rails, one an outboard rail, one an inboard rail, and one a middle rail thereby providing a set of rails of three different gauges, and the means for selectively providing for each tray to be directed onto one of the levels of rails includes means to selectively direct trays to the inboard rails of the first level of rails, to the middle rails of the second level of rails and to the outboard rails of the third level of rails.

3. The carrier of claim 2 in which the means for selectively providing for each tray to be directed onto one of the levels of rails includes a portion of the sets of rails at one of the levels which portion is pivotable from a first position in which the portion forms a part of the sets of rails at that one level to a second postion in which one end of the portion is pivoted to engage the sets of rails at one of the other levels.

4. A method of storing vehicles comprising: providing sets of parallel spaced-apart rails at a first level; providing sets of parallel spaced-apart rails at a second level above the first level of rails; providing sets of parallel spaced-apart rails at a third level above the second level of rails; the sets of rails at each level being rails of different gauges, the gauge of the rails at the first level being the narrowest and the gauge of the rails at the third level being the widest; providing carrier trays with wheels engagable with the rails of one of each gauge of the rails at the three levels; and selecting a carrier tray to support one end of the vehicle to be stored, the wheels of the tray corresponding to the gauge of the rails at the level upon which that end of the vehicle is to be stored thereby directing that tray onto the set of rails at the desired level; moving the vehicle to be stored onto the selected carrier trays; and moving the carrier trays onto the rails.

5. The method of storing vehicles of claim 4 in which each set of rails at each level is a set of multiple rails that includes three parallel spaced-apart rails, one an outboard rail, one an inboard rail, and one a middle rail thereby providing a set of rails of three different gauges at each level; and providing means for selectively providing for each tray to be directed onto one of the levels of rails includes means to selectively direct trays to the inboard rails of the first level of rails, to the middle rails of the second level of rails and to the outboard rails of the third level of rails, so that a tray supporting one end of the vehicle being carried can be positioned on either the same level of rails as the tray supporting the other end of the vehicle or on a different level of rails, the position of a vehicle on the carrier thereby being determined by selecting carrier trays engagable with the desired gauge of rails.

* * * * *